Figure 4:
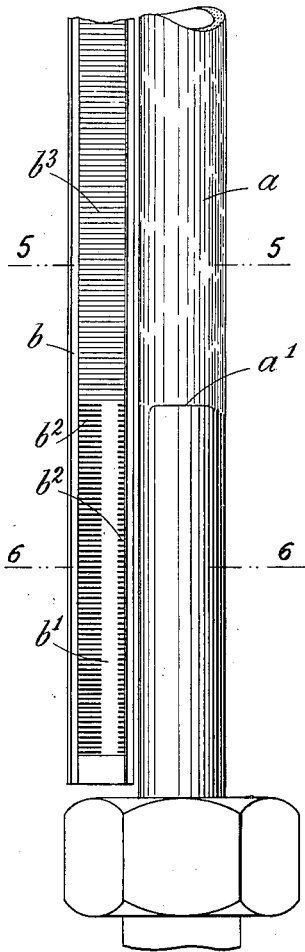

L. G. WALKER.
ILLUMINATION OF GAGE OR LIQUID LEVEL GLASSES AND THE LIKE.
APPLICATION FILED JULY 20, 1917.
1,289,581.
Patented Dec. 31, 1918.
2 SHEETS—SHEET 1.
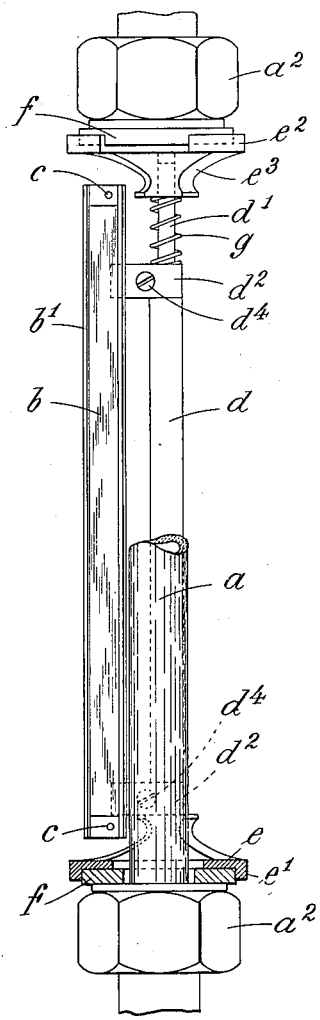
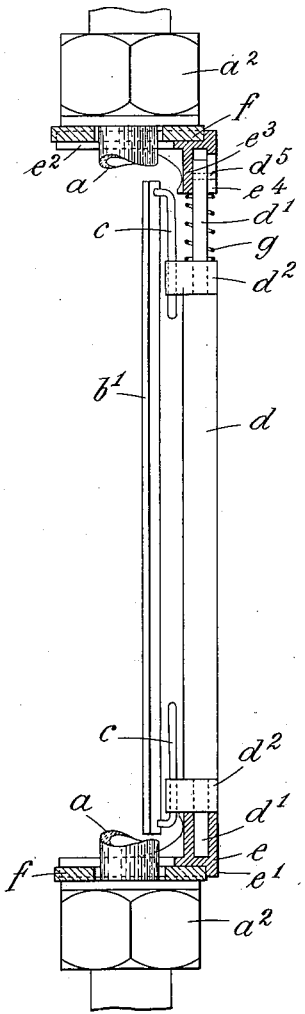
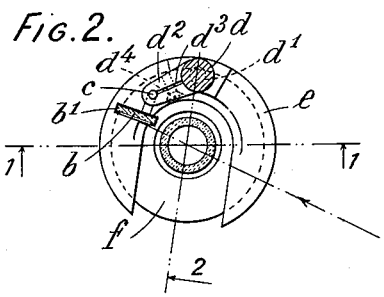

L. G. WALKER.
ILLUMINATION OF GAGE OR LIQUID LEVEL GLASSES AND THE LIKE.
APPLICATION FILED JULY 20, 1917.

1,289,581.

Patented Dec. 31, 1918.
2 SHEETS—SHEET 2.

Inventor
Laurence G. Walker

UNITED STATES PATENT OFFICE.

LAURENCE G. WALKER, OF SUTTON, ENGLAND.

ILLUMINATION OF GAGE OR LIQUID-LEVEL GLASSES AND THE LIKE.

1,289,581.          Specification of Letters Patent.      Patented Dec. 31, 1918.

Applicaton filed July 20, 1917. Serial No. 181,923.

*To all whom it may concern:*

Be it known that I, LAURENCE GASTON WALKER, a subject of the King of Great Britain and Ireland, residing at Martlesham, Egmont Road, Sutton, Surrey, England, have invented certain new and useful Improvements in the Illumination of Gage or Liquid-Level Glasses and the like, of which the following is a specification.

This invention relates to the illumination of gage or level glasses and the like, and is particularly applicable to boiler water gage glasses, but the invention may also be applied to other similar apparatus, such for example, as spirit bubble level gages.

The object of the invention is to provide improved means whereby the height or position of the liquid column in the gage or level or an indication of it, shall be distinctly visible from a distance without causing visual strain or inconvenience to the observer, and without the necessity for close inspection, as required in the ordinary method of illuminating water level gage glasses.

In carrying out my invention in its preferred method, I utilize the optical properties of the gage glass and its contents in conjunction with a source of light, adapted to illuminate the gage glass, and a screen arranged in proximity to the gage glass, approximately at the focus thereof, so that owing to the lens action of the glass and its contents a bright line of light will be projected on to the screen by that part of the gage glass filled with liquid and which thus acts as a condensing lens of very short focus, while a diffused line or band will be projected on to the screen by the upper empty part of the glass, which acts as a diffusing lens, the line of demarcation, representing the top of the liquid column, being thus clearly apparent.

The principles employed are as follows:—

When the glass tube is partly filled with water or other transparent liquid the portion holding the water forms a short focus double convex or cylindrical lens, and if light from a suitable source is allowed to fall on the surface of the tube, a sharp brightly focused line image of the source of light will be formed on the screen, the upper end of the luminous line terminating sharply at the position coinciding with the top or end of the liquid column.

The empty portion of the tube acts as a concave lens and forms a very diffused image of the source.

The combined effect of the sharply focused bright image and the widely diffused image produces a very distinct index, the dividing line of which forms an immediate and substantially true indication of the height of the liquid column in the gage glass tube.

It is to be stated that in the methods hereinafter mentioned, the illuminant may consist of an electric lamp, tubular, or otherwise, or any other suitable light source, such as an incandescent gas burner, etc., also more than one source of light may be used. In cases where the device can be arranged in a suitable position relatively to a window or the like, daylight can be employed as the light source. The light incident on the tube may be reflected light from a suitable surface which may be interposed to give the correct direction to the beam.

In some cases it may be desirable to have a colored image, in which case a color screen or screens may be interposed between the light and the viewing screen or index.

I will now describe some ways in which the invention may be carried out in practice.

Method 1: A divergent, or parallel beam of light may be directed so as to pass through the cylindrical water gage glass, in such a way that the whole of the tube is covered by the beam. A ground glass or other screen may be placed in such a position approximately in the focal plane of the gage glass lens, as to receive a well defined projected bright band of light, and its dark attendant shadow band, formed by the liquid column, and also the diffused illumination produced by the upper empty portion of the tube. The screen or screens may be arranged edge-on to the side of the tube, or tangent thereto, the effect produced being that the edge or contacting surface of the screen cuts into the emerging beam of light; with the result that the line foci which converge very near to the perimeter of the tube, focus at or near the edge or part of the screen which is in contact or near to the tube surface, and since the screen cuts into the beam obliquely or at an angle the line foci are extended to form a wider band of light than would be produced by a direct focus on a flat surface, that is, a surface at right angles to the rays.

Thus the position and any variation in water level may be at once recognized by the position and variation in length of the bright luminous line or band index. In this method one or two sources of light may be used; also one or two image screens may be used, one on each side of the gage glass to receive the projected line foci, so as to be visible over a wide angle of view.

According to a modification in the way of viewing the image a totally reflecting prism or prisms may be employed, the light passing through the gage glass tube being projected on to the surface of a totally reflecting prism or prisms and thence reflected to the screen.

When the source of light is placed some distance in front and below the gage glass tube, then light incident on the tube will pass through the liquid column and form a bright line focus on a screen, as already described, but the oblique light incident at the critical angle on the surface of the liquid will be totally reflected, with the result that a dark shadow will be formed just above the bright line, thus producing a well defined index line, which is accentuated by the dark shadow, the light passing through the upper empty part of the tube producing, as previously explained, a broad diffused image.

Method 2: The gage glass may be illuminated from the back and a diffusing screen may be placed in front of the glass with water level index marks thereon, the effect being that a broad line of light will be seen on the screen corresponding to the empty portion of the tube, and a bright thin luminous line corresponding to the length of the liquid column, the division formed by the wide and narrow lines of diffused and bright light forming the index.

In these methods the beams of light from the source may be colored in a suitable manner to produce a colored indication or different colored beams may be directed above and below the normal water level to act as indicators.

A lens or lenses may be used to condense the light from the light source so as to increase its luminosity.

For the purpose of rendering the image or indication still more noticeable, the glass tube may be partly darkened, ground, or rendered non-transparent where required, by painting or otherwise, and, in some cases, the screen may be attached to or be part of the glass tube, or may be in the form of a fluorescent screen.

In some cases I may employ in combination with the gage glass and screen in proximity thereto, colored or other indicators or level marks whereby the observer may readily see whether the water level is normal or approaching a higher or lower level.

The invention will now be illustrated, by way of example, with reference to the accompanying drawings, in which:—

Figure 1 represents in elevation partly in section on the line 1—1, Fig. 2, a strip indicator with means for mounting it on the gage glass.

Fig. 2 being a horizontal section, and

Fig. 3 a side elevation of Fig. 1.

Fig. 4 is a view of a gage glass and screen illustrating the effect produced when the light is arranged at the side and approximately centrally of the glass.

Figure 5:
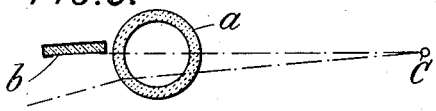
Figure 6:
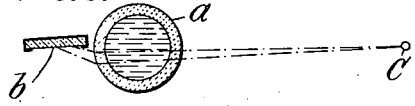

Figs. 5 and 6 being cross sections on the lines 5—5 and 6—6 respectively of Fig. 4.

Figure 7:
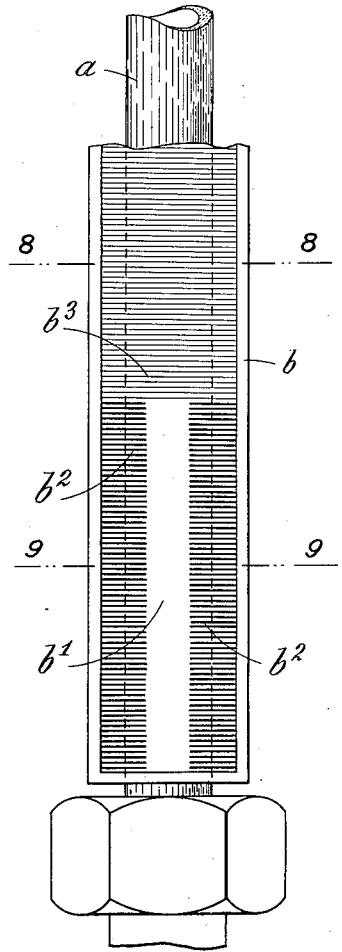

Fig. 7 illustrates the effect produced when a diffusing screen is arranged in front of the gage glass and the light proceeds from the back.

Figure 8:
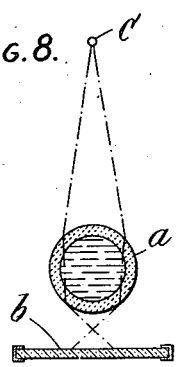
Figure 9:
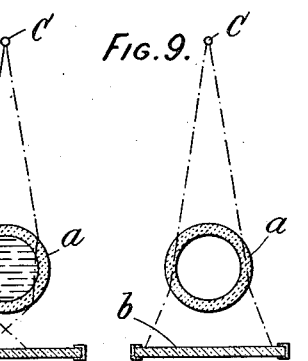

Figs. 8 and 9 being cross sections on the lines 8—8 and 9—9 respectively of Fig. 7.

Similar letters indicate like parts throughout the drawings.

Referring first to Figs. 4, 5 and 6, $a$ represents an ordinary gage glass, $a'$ representing the liquid level therein. $b$ is a screen or strip of opal glass, or other suitable material arranged, as shown in Figs. 5 and 6, adjacent to the gage glass $a$ approximately in the focal plane of the lens formed by the glass and its contents. The light is supposed to proceed from the point $c$ to one side and approximately centrally of the length of the gage glass, although the exact horizontal position of the light is not of great importance.

The effect produced on the screen $b$ will be as shown in Fig. 4, the lower portion of the glass $a$, filled with liquid, acting as a condensing lens and bringing the image of the light to a focus at a point close to the perimeter of the tube. If the screen were arranged substantially at right angles to the direction of the rays of light and at the focal distance, a thin line of light would be projected on the screen, but in order to render the screen clearly visible and also to obtain a wider projection of light, the screen is arranged so that the plane of its surface forms a very wide angle with the rays of light and the focal line is therefore spread out, as it were, and is visible in the form of a bright band or strip of light $b'$, the parts $b^2$, $b^2$ of the screen on either side of the light strip appearing dark, and helping to throw the bright strip into prominence. That portion of the tube above the liquid level acts as a dispersing lens with the result that the corresponding portion of the screen shows a diffused brightness $b^3$ in strong contrast to the light strip $b'$.

With such an arrangement, it has been found in practice that, at a distance of about 25 feet, the actual water level is invisible to the eye, or practically so, but the bright strip of light is very distinct, and gives an exceedingly clear and easily read indication of the water level and it can, further, be readily recognized whether the tube is full or empty.

In the arrangement illustrated in Figs. 7, 8 and 9, the light $c$ is arranged behind and a diffusing screen $b$ is arranged in front of the gage glass $a$ so that an image of the light line is focused on to the screen with an effect similar to that described in relation to Fig. 4.

In the arrangement illustrated in Figs. 4 to 9, the light is assumed to be more or less on a level with the top of the liquid in the gage glass. If the source of light is arranged below the gage glass, a slightly different effect will be produced, the strip of bright light projected on to the screen will appear slightly higher than the actual liquid level, while immediately above it a section will appear which will be considerably darker than the appearance of the upper part of the gage glass. This is due to the fact that some of the light rays which strike upwardly against the top of the liquid column will be reflected and, consequently, will not pass through the liquid to illuminate the screen.

A practical form of the invention embodying a screen in proximity to a gage glass will now be described with reference to Figs. 1, 2 and 3.

$a$ represents the ordinary gage glass secured in place by the usual nuts $a^2$. $d$ is a rod, telescopic or otherwise, having reduced ends $d'$ upon which are mounted hinge members $d^2$ capable of turning horizontally about said rod. These hinged members $d^2$ are slotted at $d^3$, Fig. 2, and their outer ends are bored to receive hinge pins $c$, mounted on the holder $b'$ for the screen $b$, which may be in the form of a piece of white card or opal glass, or a strip of material, colored or otherwise. These pins fit in the hinge members $d^2$ so that they can turn therein. A set screw $d^4$ is provided in each member $d^2$ for the purpose of locking the hinge member $d^2$ both to the rod $d'$ and also to the pin $c$, when the screen is placed in its adjusted position.

On the lower end $d'$ of the rod $d$ is secured a horseshoe plate $e$ having a flange $e'$ on its underside, thus providing a recess in which a circular washer $f$ on the tube $b$ can be seated.

A similar plate $e^2$ having a similar flange and recess is mounted on the upper end $d'$ of the rod $d$ in such a way that it can move up and down thereon. In the example illustrated the plate $e^2$ has a projection $e^3$, which is bored vertically to receive the end $d'$ of the rod $d$, a vertical slot $e^4$ being made in the projection $e^3$ to receive a pin $d^5$ on the rod $d$ to prevent lateral turning of the plate $e^2$ about $d'$. Between the underside of the projection $e^3$ and upper hinge member $d^2$ a spiral spring $g$ is arranged, so as to press the plate upward and keep it in engagement with its washer $f$ similarly to the lower plate $e$.

As shown in Fig. 1, the space between the ends of the arms of each of the horseshoe plates is less than the diameter of the washer $f$, so that when the plates have been engaged over the latter, the parts can only be disengaged by pressing down the upper plate $e^2$ against its spring $g$ and then removing it with its rod and screen holder laterally.

By providing a double hinge construction as described, the screen can be very conveniently adjusted relatively to the gage glass, either nearer or farther from it, and also tangentially or at other angle thereto. Further, owing to the double hinge arrangement, if necessary or desirable, the screen can be slightly shifted or set at an angle relatively to the gage glass instead of parallel therewith. When the screen has been adjusted into the desired position, it can be locked in place by tightening the screws $d^4$.

While the above constitutes a convenient way of mounting the screen, it is to be understood that, in that respect, the invention is by no means limited to such arrangement, as the screen can be mounted in any other way, with or without capability of adjustment, or it might be mounted directly on the gage glass itself or its connections.

As already stated my invention is based on the different effects produced by the optical properties of a gage glass partly filled with liquid, such effects being shown on a screen arranged approximately in the focal plane of the lens system so constituted. My invention, therefore, excludes the use of a mirror outside the focal plane for merely reflecting an image of the gage glass to the observer's eye, as the advantages obtained by my invention are not obtained by mere reflection. The effect given by a mirror reflection will be no more distinct than that obtained by viewing the gage glass direct, whereas according to my invention the observer sees an intensified indication. He does not see a reflected image of the gage glass, but a plane projection consisting of a concentrated bright line or band of light corresponding to that part of the tube filled with liquid and a shadow or diffused effect produced by the unfilled portion of the tube. Hence I prefer to use as the screen ground opal glass or white card on which the bright line or band of light is very clearly focused.

What I claim and desire to secure by Letters Patent is:—

1. A method of indicating the level of the liquid column in boiler gage glasses and the like, in which the optical properties of the gage glass and its liquid contents are utilized, consisting in projecting light on to one side of the gage glass and the arrangement of a screen on the other side thereof whereby contrasting light effects are produced on the screen corresponding to the height of the liquid in the gage glass owing, on the one hand, to the presence of liquid in one portion of the tube, and, on the other hand, to absence of liquid from the other portion of said tube.

2. A method of indicating the level of the liquid column in boiler gage glasses and the like, in which the optical properties of the gage glass and its contents are utilized as a lens, consisting in projecting light by means of the gage glass on to a screen or the like arranged approximately in the focal plane of the lens formed by the gage glass and its liquid contents, so as to produce a bright indicating line or strip on the screen corresponding to the height of the liquid in the gage glass, while the upper part of the gage glass above the liquid level, acting as a diffusing lens, produces a contrasting light effect on the upper part of the screen.

3. For carrying out the method of indicating the level of the liquid column in boiler gage glasses and the like, as set forth in claiming clause 1, the arrangement of a screen or the like approximately in the focal plane of the lens formed by the gage glass and its liquid contents, said screen being arranged with the plane of its surface forming a wide angle with the rays from the light source, for the purpose described.

4. A gage glass indicator comprising a gage glass, a screen mounted laterally of the gage glass in a plane parallel to the longitudinal plane of the gage glass, and means for adjusting the screen toward or from the gage glass and tangentially to the gage glass.

5. A gage glass indicator comprising a gage glass, a screen arranged laterally of the gage glass and in a plane parallel to the longitudinal plane thereof, means for adjusting the screen toward or from and tangentially to the gage glass, a carrier for said screen, a hinge connection between the screen and carrier and means for removably securing said carrier to the gage glass mounting.

In testimony whereof I have affixed my signature in presence of two witnesses.

LAURENCE G. WALKER.

Witnesses:
MARGUERITE M. KROBER,
STANLEY C. S. DICKER.